United States Patent
Ikegawa et al.

[19]

[11] Patent Number: 6,104,575
[45] Date of Patent: Aug. 15, 2000

[54] PLANAR THIN-FILM MAGNETIC HEAD AND MANUFACTURING METHOD THEREFOR

[75] Inventors: Yukinori Ikegawa; Michiaki Kanamine, both of Kawasaki, Japan

[73] Assignee: Fujitsu Limited, Kawasaki-shi, Japan

[21] Appl. No.: 09/017,432

[22] Filed: Feb. 2, 1998

[30] Foreign Application Priority Data

Sep. 5, 1997 [JP] Japan ................................... 9-240935

[51] Int. Cl.⁷ .................................................. G11B 5/147
[52] U.S. Cl. ............................................................... 360/126
[58] Field of Search .......................... 360/125, 119–121, 360/127, 126

[56] References Cited

U.S. PATENT DOCUMENTS

| | | | |
|---|---|---|---|
| 4,837,924 | 6/1989 | Lazzari | 360/125 |
| 4,949,207 | 8/1990 | Lazzari | 360/119 |

FOREIGN PATENT DOCUMENTS

| | | |
|---|---|---|
| 55-135324 | 10/1980 | Japan . |
| 03127308 | 5/1991 | Japan . |
| 04119506 | 4/1992 | Japan . |
| 04119509 | 4/1992 | Japan . |
| 064829 | 1/1994 | Japan . |
| 06338030 | 12/1994 | Japan . |
| 07182620 | 7/1995 | Japan . |

*Primary Examiner*—Allen T. Cao
*Attorney, Agent, or Firm*—Greer, Burns & Crain, Ltd.

[57] ABSTRACT

A planar thin-film magnetic head including a lower magnetic pole having a first end portion and a second end portion, and an upper magnetic pole having a first end portion magnetically joined to the first end portion of the lower magnetic pole and a second end portion. A gap is defined between the second end portion of the lower magnetic pole and the second end portion of the upper magnetic pole. The thin-film magnetic head further includes a coil having a center positioned in the vicinity of the gap and spirally formed so as to pass between the upper magnetic pole and the lower magnetic pole. The coil is embedded in an insulating layer.

4 Claims, 7 Drawing Sheets

PLANAR THIN-FILM MAGNETIC HEAD AND MANUFACTURING METHOD THEREFOR

BACKGROUND OF THE INVENTION

1. Field of the Invention

The present invention relates to a planar thin-film magnetic head and a manufacturing method therefor.

2. Description of the Related Art

In recent years, a reduction in size and an increase in capacity of a magnetic disk drive as a kind of external storage device for a computer have been desired. In response thereto, the flying height of a magnetic head slider from a magnetic disk surface in recording and reproducing information is increasingly reduced, and the magnetic head slider is required to ensure stability and reliability at a low flying height and is also required to have a reduced weight.

In general, a magnetic head slider used in a magnetic disk drive has a structure such that a vertical-structure type thin-film magnetic head is located on an rear end surface (air outlet end surface) of the slider perpendicular to a flying surface (medium opposing surface) of the slider. As a result, the height (thickness) of the slider is necessarily increased by the height of the vertically located thin-film magnetic head, and it is therefore greatly difficult to realize a compact, light magnetic head slider. To cope with this, there has been proposed a planar thin-film magnetic head slider having a thin-film magnetic head horizontally located on the medium opposing surface to thereby reduce the height of the magnetic head slider.

FIG. 1 shows a schematic structure of a conventional planar thin-film magnetic head proposed in Japanese Patent Laid-open Nos. 3-127308 and 6-4829, for example. Referring to FIG. 1, a gap 10 for generating a signal magnetic field in a recording medium 16 is defined in a lower magnetic pole 2. The lower magnetic pole 2 is connected to an upper magnetic pole 4 by a pair of back closures 6 and 8, thus being magnetically closed.

A pair of spiral coils 12 and 14 for generating a signal magnetic field are located about the back closures 6 and 8, respectively. As shown in FIG. 1, the gap 10 in the conventional planar thin-film magnetic head is normal to the recording medium 16.

In the conventional planar thin-film magnetic head, the spiral coils 12 and 14 are located so that the back closures 6 and 8 become the centers of the coils 12 and 14, respectively. Accordingly, the sectional area of each back closure is limited by the area of a central portion of each coil, so that it is impossible to ensure a large sectional area of each back closure. As a result, the magnetic resistance of the back closures 6 and 8 is increased to cause a decrease in strength of the signal magnetic field at the back closures 6 and 8. Further, since the gap in the conventional planar thin-film magnetic head is normal to the recording medium, it is difficult to form a gap having a narrow width (0.3 μm or less).

SUMMARY OF THE INVENTION

It is therefore an object of the present invention to provide a planar thin-film magnetic head which can reduce the magnetic resistance of a magnetic circuit to output a sufficiently strong recording signal magnetic field.

It is another object of the present invention to provide a manufacturing method for a planar thin-film magnetic head which can easily achieve formation of a narrow gap.

In accordance with an aspect of the present invention, there is provided a planar thin-film magnetic head comprising a lower magnetic pole having a first end portion and a second end portion; an upper magnetic pole having a first end portion magnetically joined to said first end portion of said lower magnetic pole and a second end portion; a gap defined between said second end portion of said lower magnetic pole and said second end portion of said upper magnetic pole; a coil having a center positioned in the vicinity of said gap and spirally formed so as to pass between said upper magnetic pole and said lower magnetic pole; and an insulating layer in which said coil is embedded.

Preferably, the planar thin-film magnetic head according to the present invention further comprises a protective layer defining a medium opposing surface. The lower magnetic pole is laminated on the protective layer. The width of the gap is defined by the thickness of a dielectric film.

In accordance with another aspect of the present invention, there is provided a manufacturing method for a planar thin-film magnetic head, comprising the steps of forming a lower magnetic pole on a sacrifice layer; forming a first insulating layer on said lower magnetic pole and said sacrifice layer except a part of said lower magnetic pole; forming a spiral coil on said first insulating layer so that the center of said spiral coil is positioned on said part of said lower magnetic pole; forming a second insulating layer on said spiral coil; forming a first mask resist for patterning said lower magnetic pole on said second insulating layer; etching off a portion of said lower magnetic pole unmasked by said first mask resist; forming a gap layer having a given thickness on the entire surface; forming a second mask resist for etching said gap layer on said gap layer; etching off a portion of said gap layer unmasked by said second mask resist; removing said second mask resist; forming an upper magnetic pole layer on the entire surface; forming a third mask resist for patterning said upper magnetic pole layer on said upper magnetic pole layer; etching off a portion of said upper magnetic pole layer unmasked by said third mask resist to form an upper magnetic pole; and removing said third mask resist.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
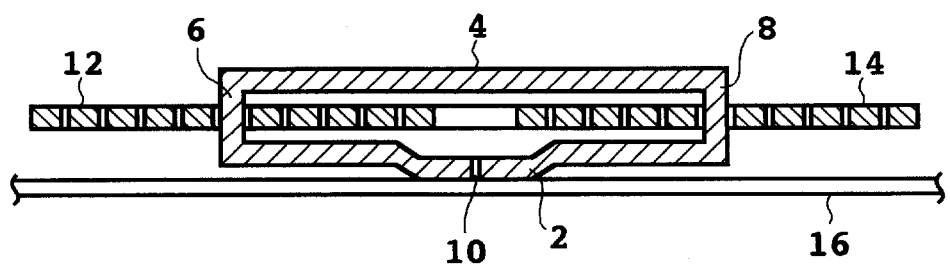
FIG. 1 is a schematic sectional view of a planar thin-film magnetic head in the prior art.
Figure 2:
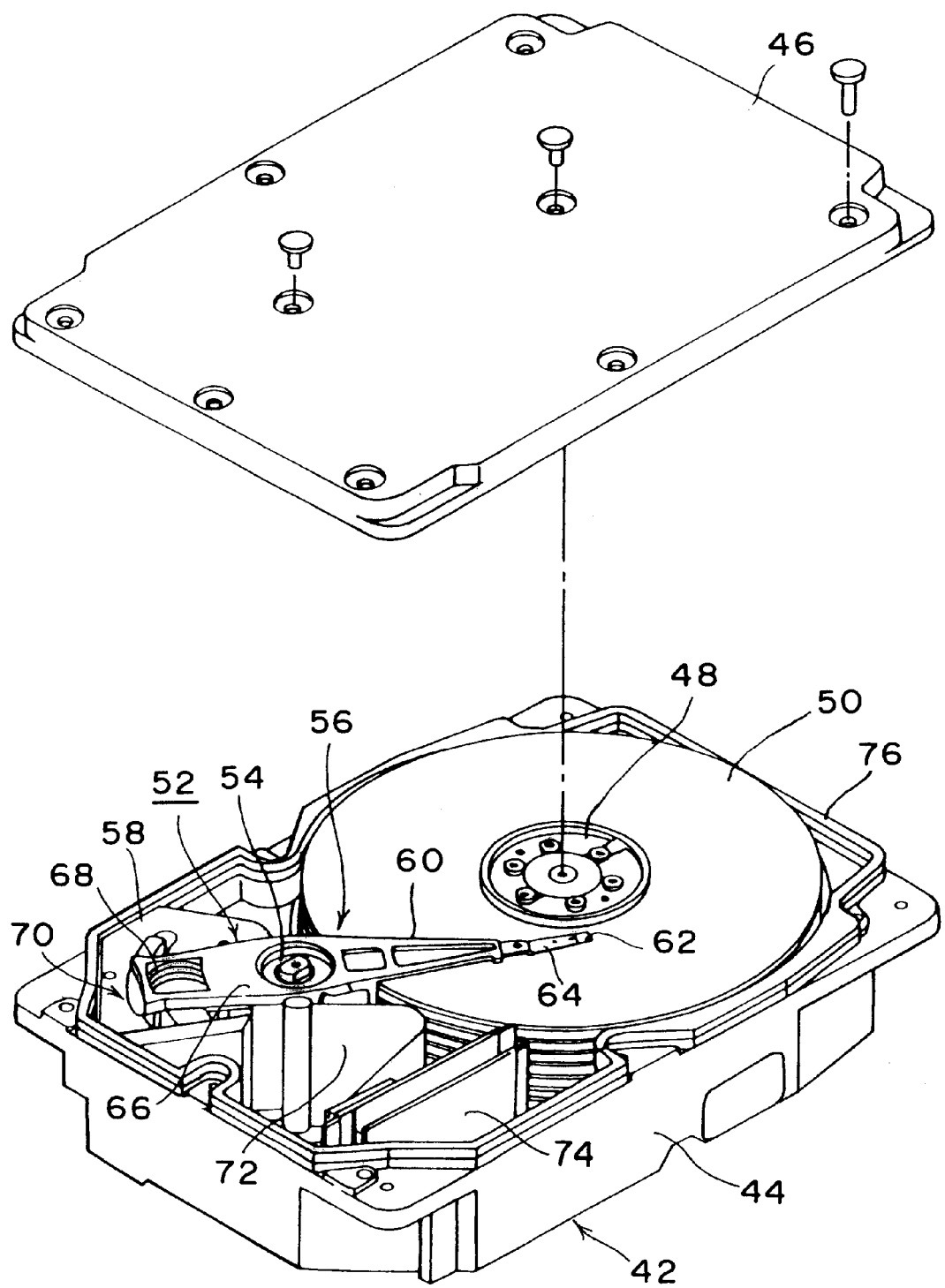
FIG. 2 is a perspective view of a magnetic disk drive.

Referring to FIG. 2, there is shown a perspective view of a magnetic disk drive in which a planar thin-film magnetic head according to the present invention is mounted. Reference numeral 42 denotes a housing (disk enclosure) consisting of a base 44 and a cover 46. A spindle hub (not shown) rotatably driven by an inner hub motor is provided on the base 44. A plurality of magnetic disks 50 and spacers (not shown) are mounted on the spindle hub in such a manner as to be alternately stacked. That is, the plural magnetic disks 50 are fixedly mounted on the spindle hub by securing a disk clamp 48 to the spindle hub by screws, and are equally spaced a given distance by the spacers.

Reference numeral 52 denotes a rotary actuator consisting of an actuator arm assembly 56 and a magnetic circuit 58. The actuator arm assembly 56 is mounted so as to be rotatable about a shaft 54 fixed to the base 44. The actuator arm assembly 56 includes a plurality of actuator arms 60 extending from the center of rotation in one direction and a coil supporting member 66 extending from the center of rotation in a direction opposite to the direction of extension of the actuator arms 60.

A suspension 64 is fixed at its base end portion to a front end portion of each actuator arm 60. A magnetic head slider 62 is supported to a front end portion of the suspension 64. The magnetic head slider 62 is integrally formed with a planar thin-film magnetic head according to the present invention to be hereinafter described. A coil 68 is supported by the coil supporting member 66. The magnetic circuit 58 and the coil 68 inserted in a gap of the magnetic circuit 58 constitute a voice coil motor (VCM) 70.

Reference numeral 72 denotes a flexible printed circuit board (FPC) for taking a signal from the planar thin-film magnetic head mounted on the head slider 62. The flexible printed circuit board 72 is fixed at its one end by a fixing member 74, and is electrically connected to a connector (not shown). An annular packing assembly 76 is mounted on the base 44. The housing 42 is sealed by securing the cover 46 through the packing assembly 76 to the base 44 by screws.

Figure 3A:
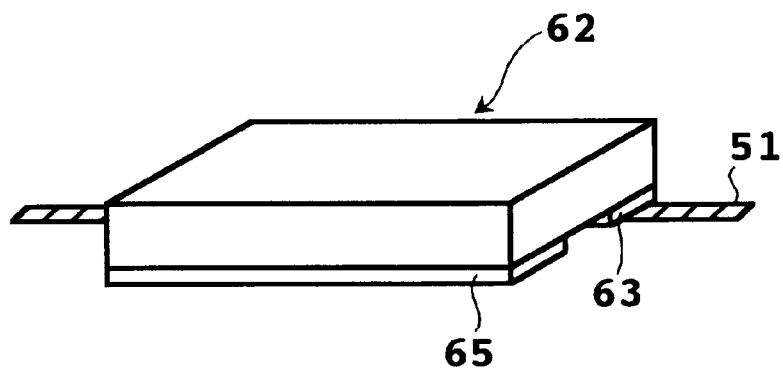
FIG. 3A is a perspective view of a magnetic head slider.
Figure 3B:
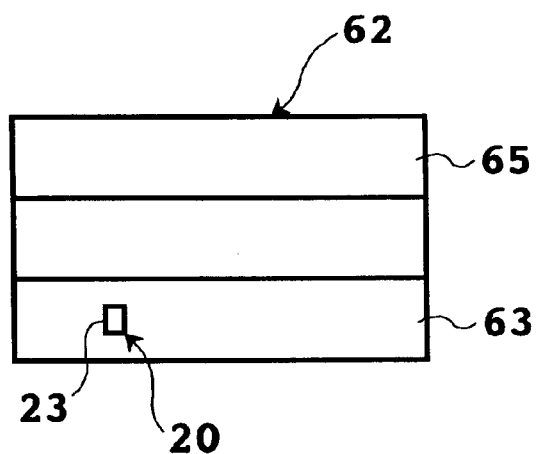
FIG. 3B is a bottom plan view of FIG. 3A.

Referring to FIG. 3A, there is shown a perspective view of the magnetic head slider 62 integrally formed with the planar thin-film magnetic head according to the present invention. FIG. 3B is a bottom plan view of FIG. 3A. The magnetic head slider 62 has a pair of flying rails 63 and 65. A planar thin-film magnetic head 20 is formed on a flying surface (air bearing surface) of the flying rail 63. Actually, the magnetic head 20 is embedded in the flying rail 63, and only a gap 23 is exposed to the flying surface of the flying rail 63. Reference numeral 51 denotes a track of the magnetic disk 50.

Figure 4:
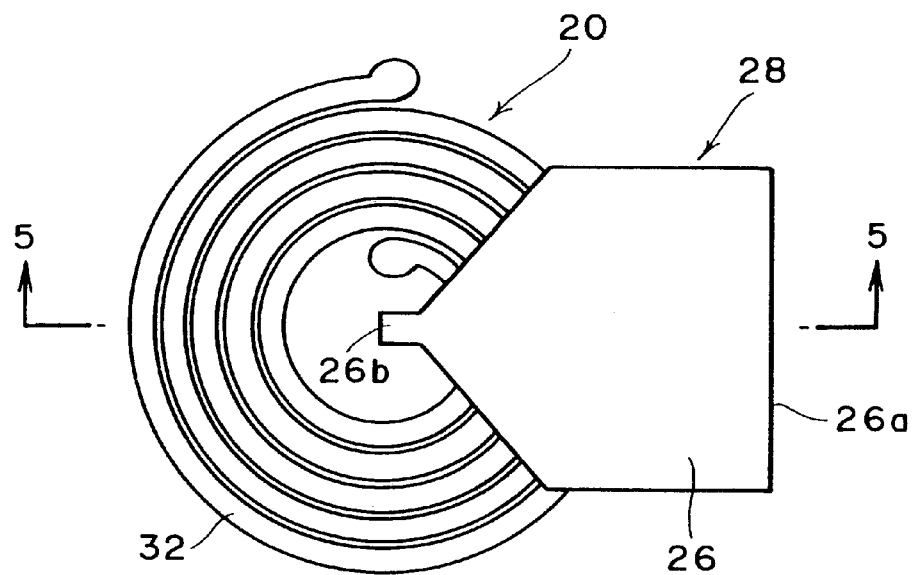
FIG. 4 is a plan view of a planar thin-film magnetic head according to a preferred embodiment of the present invention.
Figure 5:
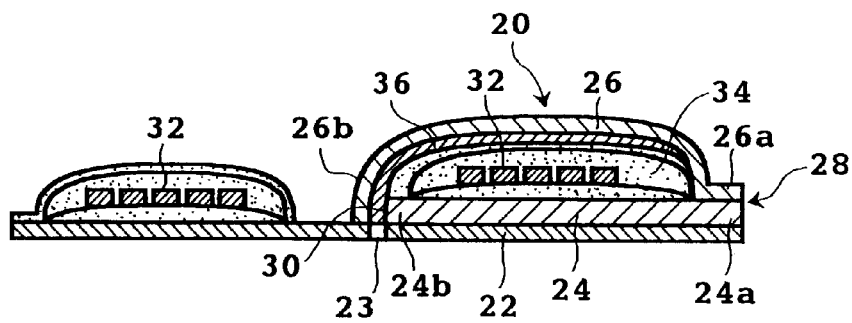
FIG. 5 is a cross section taken along the line 5—5 in FIG. 4.

Referring to FIG. 4, there is shown a plan view of the magnetic head 20 shown in FIG. 3. FIG. 5 is a cross section taken along the line 5—5 in FIG. 4. Reference numeral 22 denotes a protective layer of $SiO_2$, which defines a medium opposing surface. The protective layer 22 has a thickness of about 2 to 3 m. A lower magnetic pole 24 having a thickness of about 1 m is laminated on the protective layer 22. The lower magnetic pole 24 is formed of FeNZr, Ni-Fe, or the like. Reference numeral 26 denotes an upper magnetic pole having a thickness of about 1 m. Like the lower magnetic pole 24, the upper magnetic pole 26 is formed of FeNZr, Ni-Fe, or the like.

One end portion 24a of the lower magnetic pole 24 and one end portion 26a of the upper magnetic pole 26 are magnetically joined to form a back closure 28. A gap 30 is defined between the other end portion 24b of the lower magnetic pole 24 and the other end portion 26b of the upper magnetic pole 26. A hole 23 is formed through the protective layer 22 at a position opposed to the gap 30. Reference numeral 32 denotes a spiral coil. The center of the spiral coil 32 is positioned in the vicinity of the gap 30, and the spiral coil 32 is so formed as to pass between the lower magnetic pole 24 and the upper magnetic pole 26. The spiral coil 32 has a film thickness of about 2 to 3 m.

The spiral coil 32 is embedded in a resist insulating layer 34. A gap layer 36 of a dielectric such as $SiO_2$ and $Al_2O_3$ is laminated on the resist insulating layer 34. The gap layer 36 has a thickness of about 0.2 m. The width of the gap 30 is defined by the thickness of the dielectric gap layer 36. As apparent from FIG. 4, the back closure 28 as a joined portion between the lower magnetic pole 24 and the upper magnetic pole 26 has a large horizontally sectional area. Accordingly, the magnetic resistance of a magnetic circuit can be reduced to thereby prevent a recording signal magnetic field from being weakened at the back closure 28. Furthermore, since the center of the coil 32 is positioned in the vicinity of the gap 30, the gap 30 falls in a maximum magnetic field region, thereby increasing the output of a recording signal magnetic field.

A manufacturing method according to the present invention will now be described with reference to FIGS. 6A to 6N.

Figure 6A:
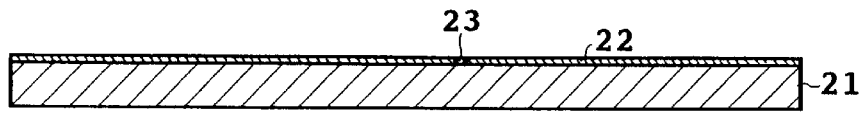
FIGS. 6A to 6N are sectional views showing a manufacturing method according to the present invention.
Figure 6B:

As shown in FIG. 6A, a protective layer 22 of $SiO_2$ is first laminated on a sacrifice layer 21 of Si, for example. The protective layer 22 has a thickness of about 2 to 3 $\mu$m. In forming the protective layer 22, a hole 23 is formed at a position opposed to a gap 30 to be formed later. As shown in FIG. 6B, a lower magnetic pole 24 is formed on the protective layer 22 and patterned to a given shape. The lower magnetic pole 24 is formed of FeNZr, for example, and has a thickness of about 1 $\mu$m.

Figure 6C:
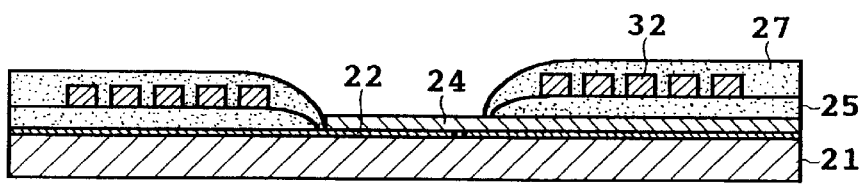

As shown in FIG. 6C, a first resist insulating layer 25 is formed on the protective layer 22 and the lower magnetic pole 24 and patterned to a given shape. The first resist insulating layer 25 has a thickness of about 2 to 3 $\mu$m. A spiral coil 32 having a film thickness of about 2 to 3 $\mu$m is formed on the first resist insulating layer 25, and a second resist insulating layer 27 is formed on the spiral coil 32 and patterned to a given shape. The second resist insulating layer 27 has a thickness of about 2 to 3 $\mu$m.

Figure 6D:
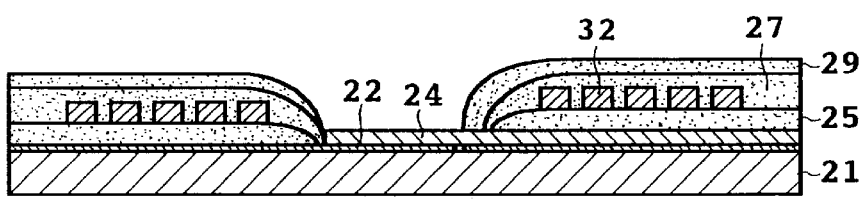
Figure 6E:
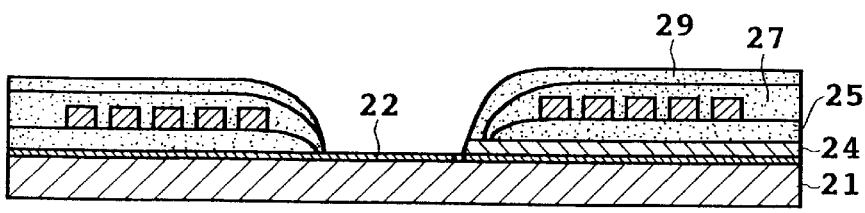
Figure 6F:
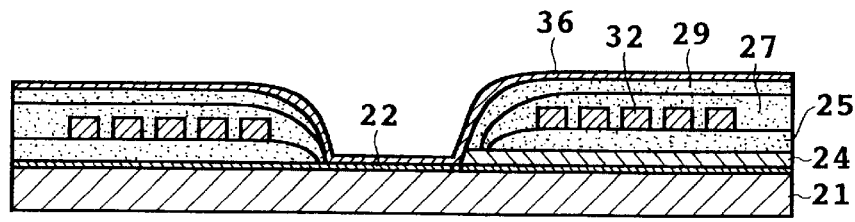

As shown in FIG. 6D, a mask resist 29 for patterning the lower magnetic pole 24 is formed on the second resist insulating layer 27 and patterned to a given shape. Then, a portion of the lower magnetic pole 24 unmasked by the mask resist 29 is etched off by ion milling (FIG. 6E). As shown in FIG. 6F, a dielectric gap layer 36 having a thickness (about 0.2 $\mu$m) corresponding to a desired gap width is formed on the entire surface. The dielectric gap layer 36 is formed of $SiO_2$, $Al_2O_3$, or the like.

Figure 6G:
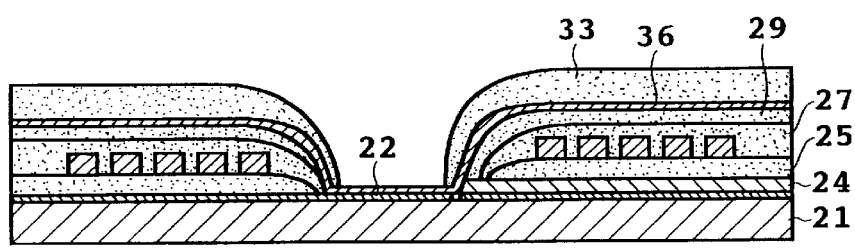
Figure 6H:
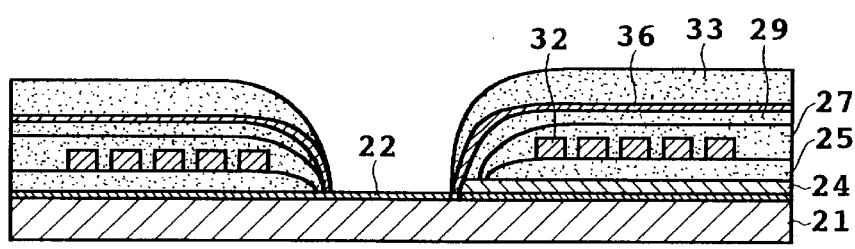
Figure 6I:
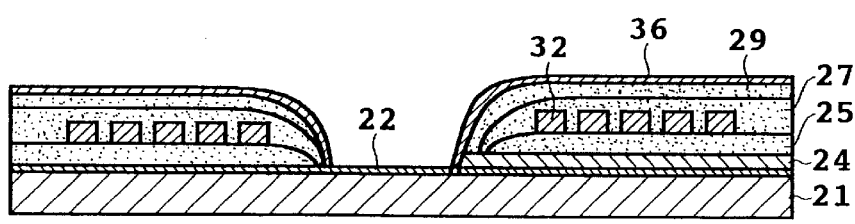
Figure 6J:
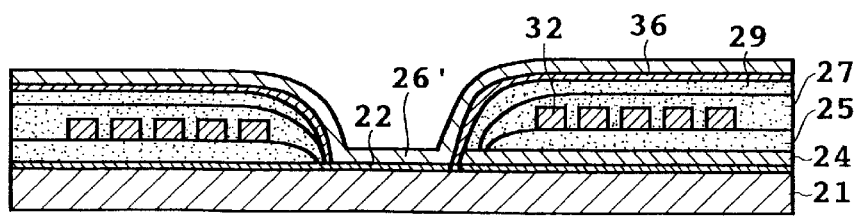

As shown in FIG. 6G, a mask resist 33 for etching the gap layer 36 is formed on the gap layer 36 and patterned to a given shape. Then, a portion of the gap layer 36 unmasked by the mask resist 33 is etched off by ion milling (FIG. 6H). The etching by ion milling may be replaced by chemical etching. As shown in FIG. 6I, the mask resist 33 is removed, and as shown in FIG. 6J, an upper magnetic pole layer 26' having a thickness of about 1 $\mu$m is next formed on the entire surface. The upper magnetic pole layer 26' is formed of FeNZr, for example.

Figure 6K:
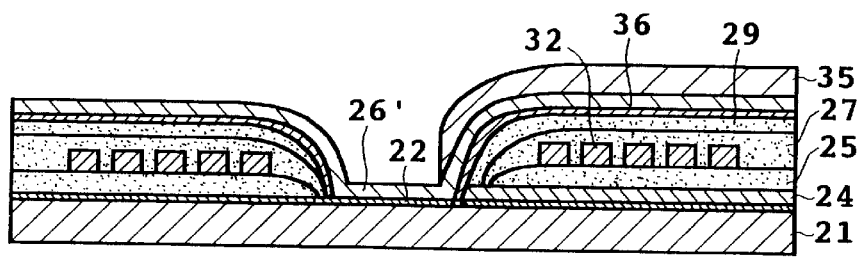
Figure 6L:
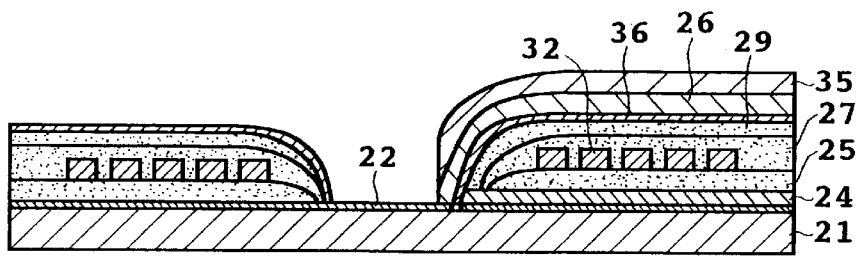
Figure 6M:
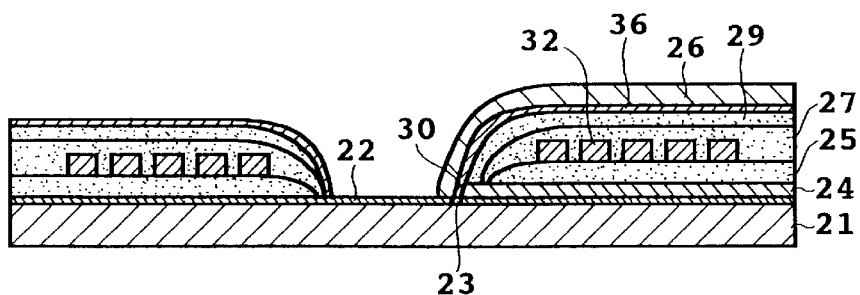
Figure 6N:
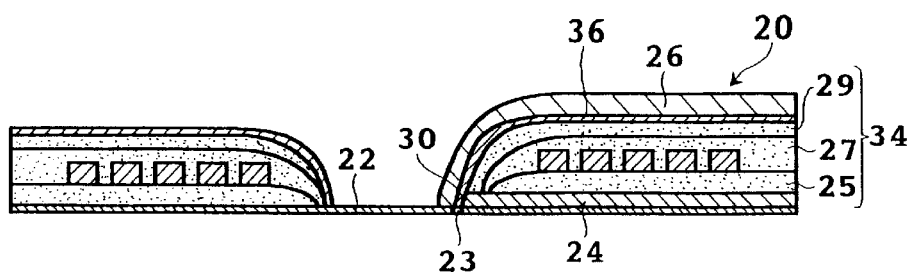

As shown in FIG. 6K, a mask resist 35 for patterning the upper magnetic pole layer 26' is formed on the upper magnetic pole layer 26' and patterned to a given shape. Then, a portion of the upper magnetic pole layer 26' unmasked by the mask resist 35 is etched off by ion milling to form an upper magnetic pole 26 as shown in FIG. 6L. As shown in FIG. GM, the mask resist 35 is removed, and as shown in FIG. 6N, the sacrifice layer 21 is removed to finally complete a planar thin-film magnetic head 20.

Although not specifically shown, the planar thin-film magnetic head 20 may be mounted on the slider, for example, by plating nickel on the SiO$_2$ protective layer 22 except the magnetic head 20 to form the slider into a given shape.

According to the present invention, it is possible to provide a planar thin-film magnetic head which can reduce the magnetic resistance of a magnetic circuit to thereby increase the output of a recording signal magnetic field. Furthermore, a narrow gap can be easily formed because the gap width is defined by the thickness of the dielectric gap layer.

What is claimed is:

1. A planar thin-film magnetic head embedded in a slider having an air bearing surface, said magnetic head comprising:

a lower magnetic pole having a first end portion and a second end portion, said lower magnetic pole being generally parallel to said air bearing surface;

an upper magnetic pole having a first end portion and a second end portion, wherein said first end portion of said upper magnetic pole is magnetically joined to said first end portion of said lower magnetic pole, said upper magnetic pole being generally parallel to said air bearing surface;

a gap defined between said second end portion of said lower magnetic pole and said second end portion of said upper magnetic pole, said lower magnetic pole and said upper magnetic pole being oriented in the same direction with respect to said gap;

a coil having a center positioned in the vicinity of said gap and spirally formed about said center so as to pass between said upper magnetic pole and said lower magnetic pole, said coil being generally parallel to said air bearing surface; and an insulating layer in which said coil is embedded.

2. A planar thin-film magnetic head according to claim 1, further comprising a protective layer laminated on a lower surface of said lower magnetic pole.

3. A planar thin-film magnetic head according to claim 1, wherein the width of said gap is defined by the thickness of a dielectric film.

4. A magnetic head slider comprising:

a slider body having an air bearing surface for generating a flying force during rotation of a disk, said air bearing surface being formed on a disk opposing surface opposed to the disk; and a planar thin-film magnetic head formed integrally with said slider body on said air bearing surface;

wherein said planar thin-film magnetic head includes:

a lower magnetic pole having a first end portion and a second end portion, said lower magnetic pole being generally parallel to said air bearing surface;

an upper magnetic pole having a first end portion and a second end portion, wherein said first end portion of said upper magnetic pole is magnetically joined to said first end portion of said lower magnetic pole, said upper magnetic pole being generally parallel to said air bearing surface;

a gap defined between said second end portion of said lower magnetic pole and said second end portion of said upper magnetic pole, said lower magnetic pole and said upper magnetic pole being oriented in the same direction with respect to said gap;

a coil having a center positioned in the vicinity of said gap and spirally formed about said center so as to pass between said upper magnetic pole and said lower magnetic pole, said coil being generally parallel to said air bearing surface; and an insulating layer in which said coil is embedded.

* * * * *